United States Patent [19]
Lockery et al.

[11] Patent Number: 5,135,062
[45] Date of Patent: Aug. 4, 1992

[54] STRAIN GAGE TRANSDUCER SYSTEM WITH GUARD CIRCUIT

[75] Inventors: Harry E. Lockery, Sudbury; Rolf P. Haggstrom, East Walpole, both of Mass.

[73] Assignee: Flintab AB, Västerås, Sweden

[21] Appl. No.: 670,397

[22] Filed: Mar. 15, 1991

Related U.S. Application Data

[63] Continuation-in-part of Ser. No. 553,663, Jul. 18, 1990.

[51] Int. Cl.$^5$ .................... G01G 3/14; G01L 1/22
[52] U.S. Cl. .................... 177/211; 73/862.628; 338/2
[58] Field of Search .............. 177/211; 73/862.67; 338/2-6

[56] References Cited

U.S. PATENT DOCUMENTS

| | | | |
|---|---|---|---|
| 3,698,495 | 10/1972 | Vogt | 73/862.67 X |
| 4,205,556 | 6/1980 | Runyan | 338/4 X |
| 4,771,639 | 9/1988 | Saigusa et al. | 338/4 X |
| 4,945,762 | 8/1990 | Adamic, Jr. | 73/862.67 |

OTHER PUBLICATIONS

"IC Op Amp Beats FETs on Input Current," by R. J. Wilder E.E.E. Dec. 1969, pp. AN29–16 through AN2-9–17.

"New Design Techniques for FET Op Amps," by Robert K. Underwood, Linear Applications Handbook, Mar. 1972, pp. AN63–5 to AN63–7, National Semiconductor, Santa Clara, CA.

*Primary Examiner*—George H. Miller, Jr.
*Attorney, Agent, or Firm*—Staas & Halsey

[57] ABSTRACT

A strain gage transducer system, such as a load cell based weighing system, is protected against moisture related errors by an electrically conducting guard circuit for terminals and other parts subject to wet or humid conditions. The guard circuit is connected to an electrical potential close to a potential of signal terminals in a strain gage bridge, for instance to a center tap in a power supply for the strain gage bridge.

16 Claims, 3 Drawing Sheets

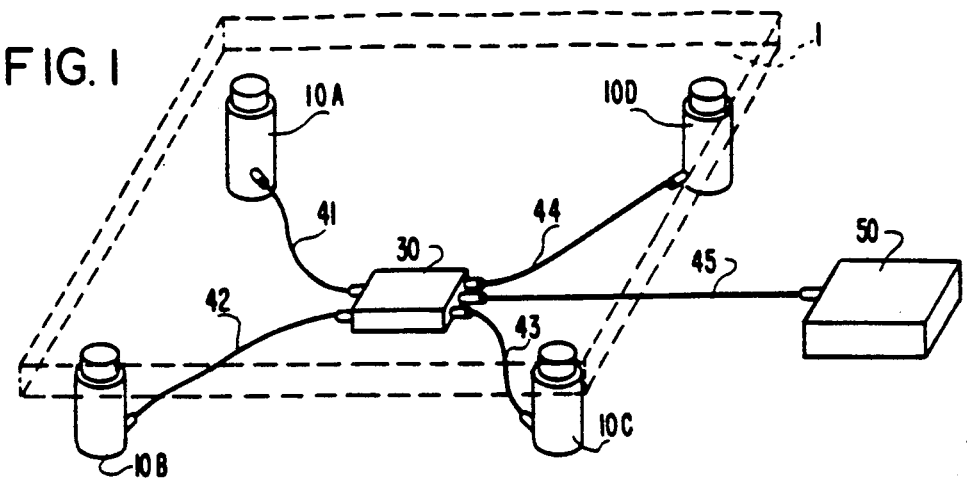
FIG. 1
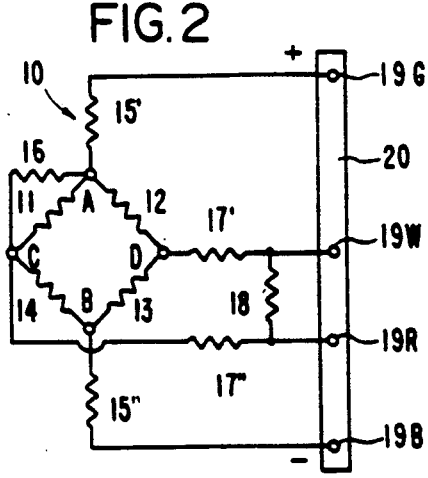
FIG. 2
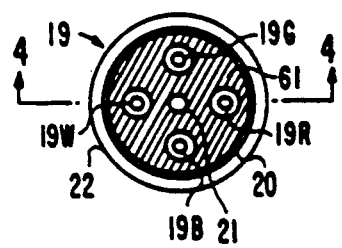
FIG. 3
FIG. 4
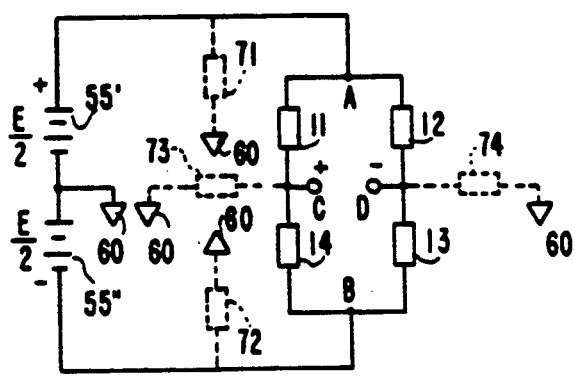
FIG. 6
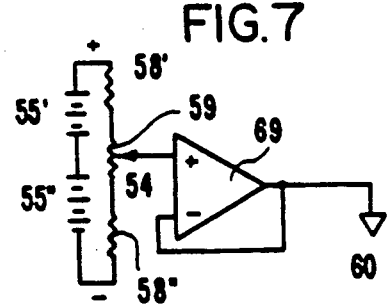
FIG. 7

STRAIN GAGE TRANSDUCER SYSTEM WITH GUARD CIRCUIT

RELATED APPLICATION

This is a continuation-in-part of pending U.S. Pat. No. application Ser. No. 07/553,663 filed Jul. 18, 1990, entitled "STRAIN GAGE TRANSDUCER SYSTEM WITH GUARD CIRCUIT".

BACKGROUND OF THE INVENTION

Strain gages are used for precision measurement of force, weight, pressure, torque, displacement and other mechanical quantities that can be converted to strain in a mechanical member. A strain gage transducer system includes one or more sensing units, such as load cells, with connection means, interconnecting cables, junction boxes, and electronic equipment for supplying power to the sensing units and for amplifying and/or converting the signals from sensing units to useful form, such as a visual display or input signals for printers or computers.

A strain gage sensing unit includes a mechanical member, such as a beam or membrane, on which the quantity to be measured acts, and typically two or four strain gages bonded to the member in such a way that they sense strain variations in the member. The strain gages are connected together to form a Wheatstone bridge, with one diagonal of the bridge connected to a voltage source and the other bridge diagonal providing an output signal. A strain gage sensing unit also typically includes temperature compensating resistors, zero adjusting means, calibrating resistors, and sometimes linearizing elements, all connected as part of the bridge circuit. The output signal from a strain gage bridge at 100% signal is typically about 20 mV for a sensor with 10 V supply voltage, and the resistance of each bridge arm is typically 350 ohm or 1,000 ohm.

A major problem with strain gage transducer systems is errors caused by moisture and other contaminants appearing as shunt resistance over a bridge arm. Such shunt resistances can cause large zero shifts that are very unstable and unpredictable, so they limit the accuracy of the system.

To reduce the moisture problem, strain gages are potted, or the sensing units with strain gages inside are sealed hermetically. Moisture can, however, still affect the insulation resistances in external cable connections to the sensing units, as well as the insulation resistance in junction boxes, and the insulation resistance between individual conductors in cables. To reduce the effect of moisture outside the sensing units, sensing units have been built with buffer amplifiers inside. It has even been proposed to include a microprocessor inside each sensing unit, so only low-impedance or digital signals are transmitted in the system. Such solutions obviously increase the complexity and cost of the sensing units and the total system cost.

SUMMARY OF THE INVENTION

The present invention provides a strain gage transducer system that has greatly reduced sensitivity to moisture, but does not suffer from any significant increase in cost or complexity compared to conventional transducer systems.

This is accomplished in accordance with the invention by a load cell with a mechanical member and strain gage bridge means having first and second terminals; power supply terminals in the load cell for connecting the first terminals of the strain gage bridge means to an external power supply circuit; signal terminals in the load cell for connecting the second terminals of the strain gage bridge means to an external signal processing circuit, the strain gage bridge means with associated external power supply circuit and external signal processing circuit being electrically isolated from the mechanical member; electrically conducting guard means for separating the signal terminals from the power supply terminals, and means for maintaining the electrically conducting guard means at a potential substantially equal to the potential of the signal terminals.

BRIEF DESCRIPTION OF THE DRAWINGS

FIG. 1 is a schematic view of a typical platform scale with strain gage load cells as an example of a strain gage transducer system.

FIG. 2 is a schematic diagram showing the strain gages with associated resistors and terminals in a typical load cell.

FIG. 3 is a front view of a header for external connection of cables in a hermetically sealed load cell, with guard means according to the invention, seen from the cable entrance.

FIG. 4 is a sectional view of the header of FIG. 3, taken along line 4—4 in FIG. 3.

FIG. 6 is a basic circuit diagram for a strain gage bridge and power supply, illustrating the function of guard means according to the invention.

FIG. 7 is a circuit diagram of a preferred embodiment of potential supply for guard means according to the invention.

DETAILED DESCRIPTION OF PREFERRED EMBODIMENTS

Figure 5:
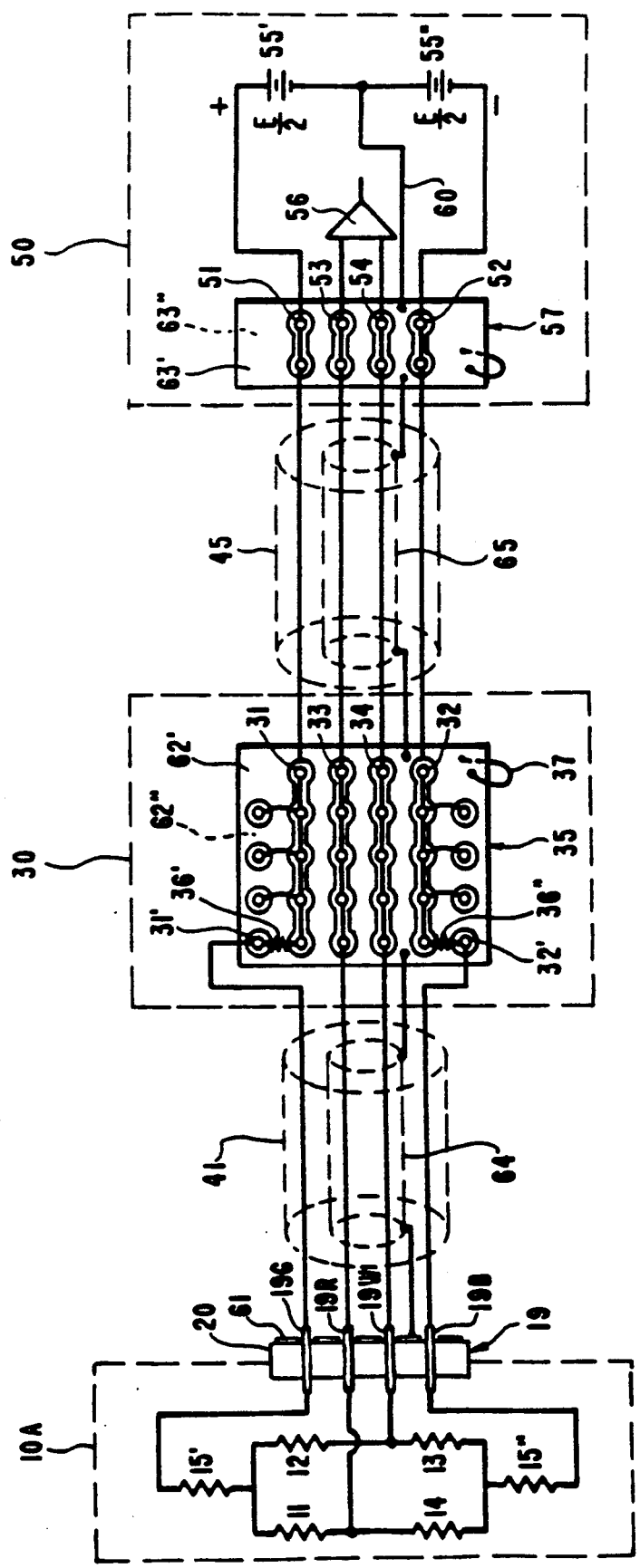
FIG. 5 is a schematic view of the interconnection of different parts of the platform scale of FIG. 1, partly in schematic form, with guard means according to the invention shown in detail.

FIG. 1 shows the basic mechanical layout of a strain gage transducer system for weighing of a platform 1 shown in phantom lines. The platform 1 is supported near its corners by four strain gage load cells 10A, 10B, 10C, 10D. The load cells are usually supported on steel plates in a foundation, but these parts do not affect the invention so they are left out in FIG. 1 for the sake of clarity. Connecting cables 41, 42, 43, 44 from corresponding load cells 10A, 10B, 10C, 10D are entered into a junction box 30, and a cable 45 connects the junction box 30 to a strain gage instrument 50, which provides power to the load cells and also converts the combined signal from the load cells to a weight display and often to input signals for a computer.

The load cells 10A, 10B, 10C, 10D may be any type of strain gage load cells, for instance shear beam type load cells, or rocker pin load cells as described in U.S. Pat. No. 4,804,053. All four load cells 10A, 10B, 10C, 10D need not even be of the same type. The differences between types of load cells are all in the mechanical design of the load cells, and the strain gage bridge circuit in each load cell 10A, 10B, 10C, 10D will always be essentially as shown in FIG. 2.

In FIG. 2, four strain gage elements 11, 12, 13, 14 all have the same nominal resistance and are connected in a Wheatstone bridge circuit. The strain gage elements 11, 12, 13, 14 are bonded to a mechanical deflection element (not shown), such as a beam or column, in such a way that the resistances of two gages (11, 13) decrease, while the resistances of the two other gages (12, 14) increase when a load is applied to the load cell. One bridge diagonal A-B is connected to supply voltage terminals 19G, 19B in series with a pair of equal temperature dependent resistors 15', 15''. The second bridge diagonal C-D is connected to signal terminals 19R, 19W via calibration resistors 17', 17'', 18. The temperature dependent resistors 15', 15'' are bonded to the deflection element near the strain gages 11, 12, 13, 14 and serve to compensate for temperature dependence in the sensitivity of the load cell. A bridge balancing resistor 16 is also shown connected across one bridge arm (11). Resistors 15', 15'', 16, 17', 17'', 18 and their proper selection are well known by those skilled in the art, and are not part of the invention, so they will not be discussed further.

The power terminals 19G, 19B and the signal terminals 19R, 19W are usually solder pins mounted on an insulating board or base 20. In high quality load cells for heavy duty industrial use, the strain gage units 11, 12, 13, 14 with associated resistors 15', 15'', 16, 17', 17'', 18 are hermetically sealed within the load cell, and the terminals 19G, 19B, 19R, 19W are mounted in a hermetically sealed header 19 as shown in FIGS. 3 and 4. FIG. 3 is a front view of the header 19 from the cable entrance, and FIG. 4 is a sectional view of the header 19 of FIG. 3, taken along 4—4 in FIG. 3.

The base 20 of the header 19 is made of glass, with through solder pins 19G, 19B, 19R, 19W and a thin metal tube 21 sealed to the glass base 20. The tube 21 is used to pump the air out of the sealed chamber in the load cell and to fill the load cell with dry nitrogen gas instead. Along its circumference the glass base 20 is sealed to a metal ring 22, which in turn is soldered or welded to the load cell. Such glass-to-metal headers are made by many suppliers, and are well known by those skilled in the art.

FIG. 5 is a simplified schematic diagram for the strain gage transducer system shown in FIG. 1, with details shown for the junction box 30, the cables 41, 45, and the strain gage instrument 50. Only one load cell 10A is shown, with header 19 and cable 41 connecting it to the junction box 30. In the junction box, there is a printed circuit board 35 with a number of solder pins attached as shown. There are four rows of solder pins 31, 32, 33, 34 that are interconnected and connected via a cable 45 to an input terminal board 57 in the strain gage instrument 50. There are also two rows of solder pins 31', 32' that are isolated from each other. The two signal terminals 19R, 19W from each load cell are connected to solder pins 33, 34 as shown for load cell 10A, so the signal terminals for all load cells 10A, 10B, 10C, 10D will be connected in parallel, and to a measuring input 56 of strain gage instrument 50 via two signal conductors in cable 45 and terminals 53, 54 of the terminal board 57 in the strain gage instrument 50. Pins 31 and 32 in the junction box are connected to a center tapped power supply 55', 55'' in the strain gage instrument 50 via two power conductors in cable 45 and terminals 51, 52 of the terminal board 57 in the strain gage instrument 50. The two power terminals 19G, 19B in each load cell are connected to solder pins 31', 32' in the junction box 30, as shown for load cell 10A, and pins 31', 32' are in turn connected to pins 31, 32 via small resistors 36', 36'' or jumper straps. The small resistors 36', 36'' are used in cases where it is desired to compensate for small differences in corner sensitivities in the platform scale.

FIG. 5 shows an extremely simplified diagram for the strain gage instrument 50. the center tapped power supply 55', 55'' is for instance shown by the symbols for two batteries, and the measuring input 56 is shown by the symbol for an amplifier with balanced input. It will be understood by those skilled in the art that the actual circuits are much more complicated, but the actual circuits are well known, and strain gage instruments suitable for the purpose are available from the trade, so more detailed descriptions are not required here.

The strain gage transducer system and the circuits described so far are conventional, and well known in the art. It is also well understood, that moisture entering the header 19, or the junction box 30, or the terminal board of the strain gage instrument 50, will cause serious measuring errors by effectively shunting a bridge arm, even though the load cell itself is hermetically sealed. If moisture enters the header 19 via the cable entry, it will cause a leakage between a supply pin and a signal pin, e.g. between pins 19G and 19R, which will change the bridge balance. The leakage can reduce the insulation resistance between two pins to less than .1 Mohm, and it can readily be shown that a 1 Mohm shunt resistance across one bridge arm will cause a zero shift of more than 4% for a system with 350 ohm strain gage elements, and more than 12% in a system with 1,000 ohm strain gage elements.

The sensing elements in industrial applications, whether load cells or other transducers, are often immersed in water and chemicals, so the headers 19 are exposed to poor insulation resistance. Moisture in the junction box 30 or at the input terminals of the strain gage instrument has the same effect, and even moisture absorbed by the conductor insulation in cables can cause unstable zero shifts in the strain gage system. The only remedy for moisture problems in strain gage transducer systems has been careful potting of the header cavity, and placing the junction box 30 and the instrument 50 in as dry as environment as possible.

According to the invention, the sensitivity to moisture can, however, be essentially eliminated in a strain gage transducer system by adding simple electrical guard means to a conventional system, as will be explained below.

The guard means, in accordance with the invention and as embodied in a standard header 19, comprises a conducting film 61 deposited on the header surface facing the outside cable entry to the load cell. This is best shown in FIGS. 3 and 4. The film 61 may be a carbon film, or a metal film, or a conducting plastic, and it can be deposited by spraying or sputtering, or by electrolytic methods, or by bonding a suitable film to the surface. As indicated in FIGS. 3 and 4, the conducting film 61 covers most of the free surface of the base 20, but it leaves uncovered narrow areas around the terminal pins 19G, 19B, 19R, 19W and the inside of the metal ring 22 surrounding the base 20. The film 61 is, however, in electrical contact with the metal tube 21, which can serve as a connector for the film 61. The conducting film 61 in the header 19 is connected to a source of guard potential 60, for instance the center tap of the power supply 55', 55" in the strain gage instrument 50, via the tube 21 and shields in cables 41, 42, 43, 44, 45 as shown in FIG. 5.

The function of the guard means in a strain gage system is best explained with reference to FIG. 6, which shows a simplified circuit diagram for a load cell with a guard means connected to a guard potential 60, such as the center tap of power supply 55', 55". The guard potential 60 in FIG. 6 represents the conducting film 61 in a header 19, or any other part of a guard means to be described below. The dotted rectangles 71, 72, 73, 74 in FIG. 6 represent possible leakage paths caused by moisture in the system, for instance in the header 19.

When a guard means is present, leakage 71 or 72 from a power supply terminal will always terminate at the guard potential 60 before it reaches a signal terminal. Such leakage from a power supply terminal to the guard potential 60 causes a small extra load on the power supply, but this has no measurable effect on the signal from the strain gage bridge.

The signal terminals are typically only 20 mV apart at 100 % load on the scale, and less at lower load, so both are essentially at the same potential relative to the power supply. Because of the symmetry of the strain gage bridge, this potential is near the midpoint between the ends of the power supply 55', 55", so when the guard means 61 is connected to the center tap of the power supply 55', 55" as shown in FIG. 6, the guard potential 60 is essentially equal to the potential of the signal terminals 19R, 19W in the strain gage bridge. Poor insulation resistance between terminals at the same potential does not cause any current flow, so the insulation resistances 73, 74 between the signal terminals 19R, 19W and the guard potential 60 do not cause any significant zero shift in the bridge.

A substantial reduction of the sensitivity to moisture is gained by a guard means 61 connected directly to the center tap of the power supply 55', 55" as shown in FIG. 6. The potentials of the signal terminals 19R, 19W are, however, not always exactly equal to the potential of the center tap of the power supply 55', 55", so a further improvement can be gained by connecting the guard means 61 to a guard potential 60 that has been adjusted to match the actual potential of the signal terminals 19R, 19W of the strain gage bridge. Such an adjustment can be achieved by deriving the guard potential 60 from a simple potentiometer circuit supplied by the power supply. Such a potentiometer circuit can also be used to provide the guard potential 60 when a center tapped power supply is not used.

An improved source of variable guard potential 60 is shown in FIG. 7. The guard potential 60 is here derived from an operational amplifier 69 with control input from a potentiometer circuit comprising a potentiometer 59 centered the end potentials of the power supply 55', 55" by means of fixed resistors 58', 58". Exact setting of the guard potential 60 is done by adjusting potentiometer 59, and thereby the output potential from amplifier 69, until the voltages measured between a guard means comprising a film 63' for terminal board 57 and terminals 53 or 54 in the strain gage instrument 50 are zero, or centered around zero. The advantage of using an amplifier after the potentiometer circuit is that the impedance in the guard circuit can be made low without need for a low resistance in the potentiometer circuit, so there is less load on the power supply. It is not necessary to make the potentiometer circuit 58', 58", 59, with or without the amplifier 69, part of the instrument 50. The end potentials from the power supply 55', 55" are available throughout the system, so the potentiometer circuit 58', 58", 59 and the amplifier 69 can be mounted for instance on the printed circuit board 35 in the junction box 30 and connected to the power supply via terminals 31, 32. This makes it easy and inexpensive to add guard circuits according to the invention to existing systems using instruments 50 without center tapped power supplies, because there is no need to change instruments.

The only effect of leakage 73, 74 between the signal terminals and the guard means in a strain gage system with a well balanced guard means is a weak shunting of the output terminals, and thereby a slight change in the sensitivity of the system. If each of the insulation resistances 73, 74 is as low as 1 Mohm, the total change in calibration of a 350 ohm strain gage system will be 0.018%, which is insignificant compared to the more than 4% zero shift arising in a similar strain gage system without the guard means.

The junction box 30 can be make insensitive to moisture by guard means comprising guard foils 62', 62" on each side of the printed circuit board 35 as illustrated in FIG. 5. Such guard foils 62', 62" can be formed at no extra cost by protecting parts of the copper foil on both sides of the printed circuit board 35 during etching of the printed circuit board. As in the header 19, the guard foils must leave insulating areas around solder pins 31, 31', 32, 32', 33, 34 to avoid shorting the pins together, and they should not be in contact with any grounded metal parts in the junction box. Both foils 62', 62" must be interconnected , e.g. by a jumper 37 as shown in FIG. 5, and connected to the guard potential 60, for instance the center tap of the power supply 55', 55", as shown in FIG. 5, or to an adjustable potential as shown in FIG. 7. Extra solder pins connected to the guard foils 62', 62" may be provided to simplify interconnection of the two guard foils 62', 62" and connections to the cable shields or other conductors. The function of the guard means comprising foils 62', 62" in the junction box 30 is exactly as described above with reference to FIG. 6.

In the strain gage instrument 50, guard means comprising guard foils 63', 63" can be provided for the terminal board 57 the same way as in the junction box, if a printed circuit board with solder pins is used as the input terminal, or by adding a conducting film as described for the header 19 if another type of terminal is used for the strain gage instrument 50.

In the cables 41, 42, 43, 44, 45, guard means also can be provided by cable shields 64, 65 between the signal conductors and the power supply conductors. Such a guard shield can be a common shield for both signal conductors, as shown in FIG. 5, or separate shields on each of the signal conductors, or equivalent shielding of the power supply conductors instead of the signal conductors. It can also be provided by individual shields for each of the four conductors in a cable. Conventional cables used in strain gage systems usually have one shield surrounding all four conductors. Such a common shield can not serve as a guard means according to the invention for the cable conductors, but it can be used to interconnect guard means elsewhere in the system with the guard potential 60.

Strain gage sensing units, such as load cells and pressure transducers, are not always hermetically sealed. The reason for not using hermetic sealing may be cost, or difficulty in achieving hermetic sealing in certain applications. In such cases moisture can enter the cavity of the sensing element, so guard means according to the invention should also be applied inside the stain gage sensing unit for complete protection against errors caused by moisture. The header block should in such cases have a guard film on both sides, not just the outside as described above, and similar guard means should be applied to all circuit boards and solder pads inside the load cell.

Figure 8:
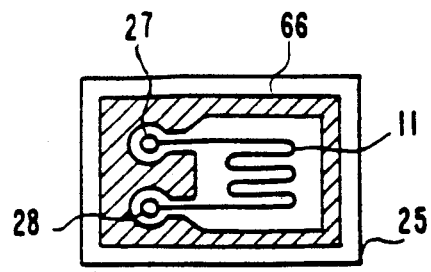
FIG. 8 is a schematic view of a strain gage element with a guard means according to the invention.
Figure 9:
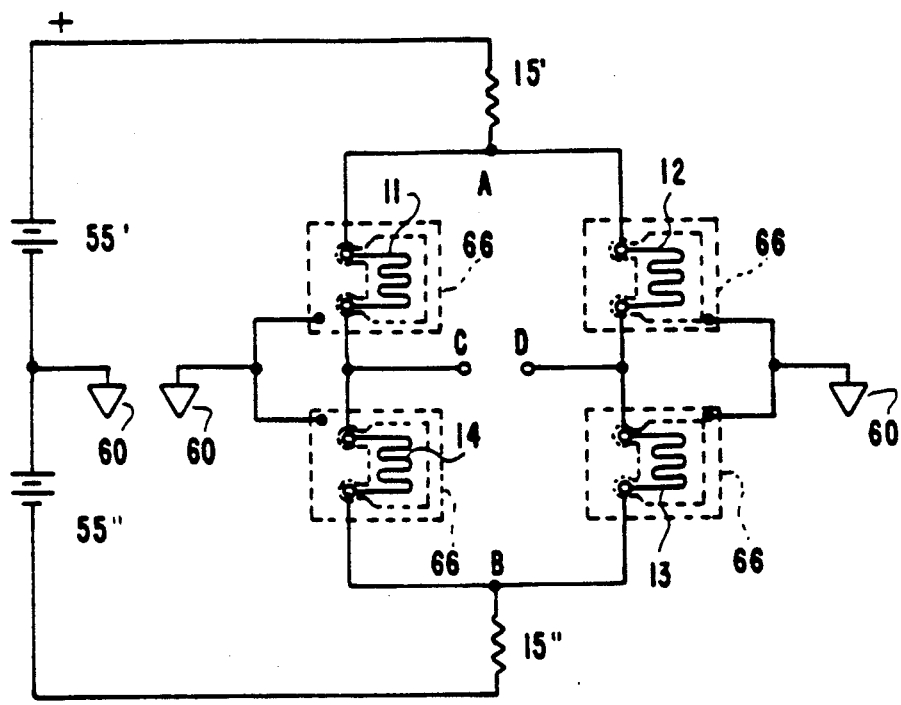
FIG. 9 is a basic circuit diagram for a strain gage bridge and power supply, with guard means according to the invention on each strain gage element.

Even the individual strain gage elements 11, 12, 13, 14 can be protected by guard means according to the invention. Some protection against the effects of moisture will be obtained by forming an electrically conducting guard ring 66 around each stain gage element 11, 12, 13, 14 as illustrated in FIG. 8, and connecting the guard ring 66 to the guard potential 60 as shown in FIG. 9. Such a guard ring 66 can easily be applied on a foil 25 of a stain gage element during its manufacture. A strain gage element 11 is always covered by a potting material after it is bonded to the mechanical deflection member in the sensing element, so leakage across the strain gage 11 is kept low, and the guard ring 66 will eliminate direct leakage between the wires connecting a power supply terminal to a solder pad 27 on the strain gage 11 and the wires connecting a solder pad 28 in a strain gage 11 to the signal terminals.

Figure 10:
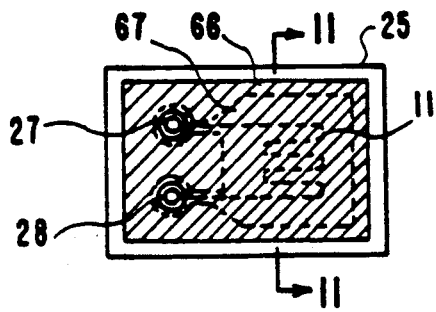
FIG. 10 is a top view of a strain gage element with a guard means applied on top of potting material.
Figure 11:
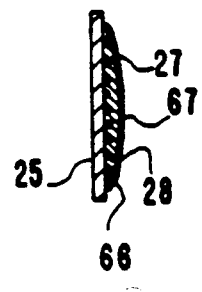
FIG. 11 is a sectional view of the strain gage element of FIG. 10, taken along line 11—11 in FIG. 11.

A more complete guard means for a strain gage element 11 can be obtained as illustrated in FIGS. 10 and 11. Specifically, a conducting film 67 is applied on top of the insulating potting material 26 used to cover the strain gage 11 after bonding to the deflection member, and then the conducting film 67 is connected to the guard potential 60 as described above. The conducting film 67 can be applied by spraying or painting or by bonding a conducting film to the potting material. It is suitable to let the conducting film 67 cover the guard ring 66, which can serve as a solder pad for connection to the guard potential 60. However, the guard film 67 should not be in contact with metal parts in the sensing units. As will be seen from FIG. 10, such a conducting film 67 can effectively serve as guard means according to the invention between the two solder pads 27, 28 of a strain gage element 11. Moreover, it is known that two dissimilar metals in an electrolyte, such as water, form a galvanic cell. Therefore, if dissimilar metals were used at the surfaces of the solder pins 31', 32', 33, 34 and the guard foils 62', 62" in a guard circuit arrangement illustrated in FIG. 5 and as described above, a galvanic voltage would appear in series with each of the leakage resistances 71, 72, 73, 74 (FIG. 6) when humidity is present. In a system with AC supply for the strain gage bridge, such galvanic voltages would not introduce errors, but a system with DC supply for the strain gage bridge can be expected to be affected.

Currents caused by galvanic voltages in series with leakage resistance 71 and 72 (FIG. 6) would be shunted from the strain gage bridge by the low impedance of the power supply 55', 55", and they would not have any measurable effect on the signal from the strain gage bridge, even in a system with DC supply for the strain gage bridge.

Currents caused by galvanic voltages in series with leakage resistances 73 and 74 (FIG. 6), however, can cause errors in a system with DC supply for the strain gage bridge. If, for example, terminals C and D (corresponding to solder pins 33 and 34 in FIG. 5) were tinned (electrode potential 0.136 V), while the guard means were pure copper (electrode potential −0.344 V), salty or acidic water would give rise to 0.480 V in series with each of the leakage resistances 73 and 74, with the plus pole in each branch directed towards the terminals C and D. If water affected only the area around terminal C, while the area around terminal D remained dry 0.480 V would appear in series with leakage resistance 73, which could become as low as 1 Mohm, while no voltage would appear in series with leakage resistance 74, which would remain infinite. In this case, the current flowing in resistance 73 would increase the potential of terminal C in a 350 ohm bridge by 0.084 mV, while the potential of terminal D remained unchanged. The signal from the strain gage bridge, which is the potential difference between the terminals C and D, therefore, would change by 0.084 mV, which is 4.2% of the full range output from the strain gage bridge. If, on the other hand, both terminals C and D were equally affected by moisture, both terminals C and D would be shifted positive by 0.084 mV relative to the guard potential 60, so the net signal from the strain gage bridge would not be affected. In actual applications, the error caused by these galvanic voltages would be somewhere between zero and 4.2%, or more if the leakage resistance were less than 1 Mohm.

If the material covering the surface of the terminals and the guard means have the same electrode potential, no galvanic voltage will arise, and there will be no errors caused by galvanic voltages. This can easily be achieved, for instance, by using tinned copper foil together with tinned solder pins. This would be suitable also for reasons of solderability and corrosion resistance.

It will be understood from the description above the guard means according to the invention can be added to a conventional strain gage transducer system with a minimum of complication and without risk of loss of ruggedness and reliability, and the added cost for a guard system is close to nil.

The advantages offered by the invention are gained when those parts of a strain gage transducer system that are subject to wet or humid conditions are provided with guard means according to the invention. It is often not necessary to use guard means in all parts of a strain gage transducer system. For instance, if the strain gage instrument is installed in a dry room it might not be necessary to guard the input terminals in the strain gage instrument. If the cable in a system use insulating material that may not be affected by water, a guard means may not be required for the cable.

In the disclosure above, it has been stated that the guard means, such as elements 61, 62', 62", 63', 63", 64 and 65, must not be in contact with any metal parts in the load cells or elsewhere. The reason for this precaution is that load cells or other sensing units, as well as metal parts elsewhere in the system, are usually connected to true ground, either deliberately or by default. Therefore, if they were in contact with different parts of the guard system there is risk for multiple ground points in the transducer system. Multiple ground points would not affect the guard system, but it might have other well known detrimental effects on the instrument 50, and might cause large induced current surges in shorted through the guard system in case of lightening strikes near the transducers.

The function of guard means according to the invention has so far been described and illustrated using a system with DC supply to the strain gage bridge as an example. However, a guard system as described above works equally well in systems with AC supply or pulsed DC supply. The invention is in no way limited by details of the examples described above, but covers all aspects and variations of guard means in all types of strain gage transducer systems.

What is claimed is:

1. Strain gage transducer system comprising:
   (a) a load cell with a mechanical member and strain gage bridge means having first and second terminals;
   (b) power supply terminals in said load cell for connecting said first terminals of said strain gage bridge means to an external power supply circuit;
   (c) signal terminals in said load cell for connecting said second terminals of said strain gage bridge means to an external signal processing circuit, said strain gage bridge means with associated external power supply circuit and signal processing circuit being electrically isolated from said mechanical member;
   (d) electrically conducting guard means separating said signal terminals from said power supply terminals; and
   (e) means for maintaining said electrically conducting guard means at a potential substantially equal to the potential of said signal terminals.

2. Strain gage transducer system according to claim 1, wherein said signal terminals and said electrically conducting guard means have surfaces with substantially equal electrode potentials.

3. Strain gage transducer system according to claim 2, wherein said signal terminals and said electrically conducting guard means have tinned surfaces.

4. Strain gage transducer system according to claim 1, further comprising a cable connecting at least the strain gage bridge means to the external power supply circuit or the external signal processing circuit of the transducer system, and wherein said electrically conducting guard means comprises a shield in said cable.

5. Strain gage transducer system according to claim 1, further comprising a junction box for power supply terminals and signal terminals, and wherein said electrically conducting guard means comprises a conducting film covering a surface in the junction box without being in electrical contact with any of said power supply terminals and signal terminals.

6. Strain gage transducer system according to claim 1, further comprising a separate junction box for signal terminals and power supply terminals and wherein said means for maintaining said electrically conducting guard means at a potential substantially equal to the potential of said signal terminals is located in said separate junction box.

7. Strain gage transducer system comprising:
   (a) a power supply terminal;
   (b) a signal terminal; and
   (c) electrically conducting guard means separating the signal terminal from the power supply terminal, said signal terminal and said electrically conducting guard means having surfaces with substantially equal electrode potentials.

8. Strain gage transducer system according to claim 7, wherein said signal terminal and said electrically conducting guard means have tinned surfaces.

9. Strain gage transducer system according to claim 7, wherein said electrically conducting guard means is arranged to be at an electrical potential substantially equal to the potential of said signal terminal.

10. Strain gage transducer system according to claim 9, further comprising means for maintaining the potential of said electrically conducting guard means substantially equal to the potential of said signal terminal.

11. Strain gage transducer system according to claim 10, further comprising a junction box for power supply terminals and signal terminals, and wherein said electrically conducting guard means comprises a conducting film covering a surface in the junction box without being in electrical contact with any of said power supply terminals and signal terminals.

12. Strain gage transducer system according to claim 11, wherein said means for maintaining said potential of said electrically conducting guard means substantially equal to the potential of said signal terminal is arranged entirely inside said junction box.

13. A strain gage transducer system comprising:
   (a) a supply terminal;
   (b) a signal terminal;
   (c) a junction box for power supply terminals and signal terminals;
   (d) an electrically conducting guard means having a conducting film covering a surface in the junction box without being in contact with any of said supply and signal terminals; and
   (e) means for maintaining said guard means at an electrical potential substantially equal to a potential of said signal terminal.

14. A strain gage transducer system according to claim 13, wherein said means for maintaining said electrically conducting guard means at an electrically potential substantially equal to a potential of said signal terminal is arranged entirely inside the junction box.

15. A strain gage transducer system according to claim 13, wherein said signal terminals and said electrically conducting guard means have surfaces with substantially equal electrode potentials.

16. A strain gage transducer system according to claim 15, wherein said signal terminals and said guard means have tinned surfaces.

* * * * *